(12) United States Patent
Kojima et al.

(10) Patent No.: US 6,668,875 B2
(45) Date of Patent: Dec. 30, 2003

(54) TIRE PUNCTURE SEALANT SET

(75) Inventors: Yoshihide Kojima, Kobe (JP); Masahiro Kishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/197,804

(22) Filed: Jul. 19, 2002

(65) Prior Publication Data

US 2003/0024596 A1 Feb. 6, 2003

(51) Int. Cl.[7] .............................................. B65B 1/04
(52) U.S. Cl. .................... 141/38; 141/329; 222/81; 152/415
(58) Field of Search ................ 141/38, 114, 329, 141/330; 222/81, 83, 88, 541.1, 541.5; 152/415

(56) References Cited

U.S. PATENT DOCUMENTS

| | | | |
|---|---|---|---|
| 4,049,160 A | | 9/1977 | Rumm |
| 4,792,061 A | * | 12/1988 | Nishida ..................... 222/107 |
| 4,795,043 A | | 1/1989 | Odet et al. |
| 5,803,310 A | * | 9/1998 | Soon ............................ 222/1 |
| 5,909,752 A | * | 6/1999 | Gerresheim et al. ......... 141/38 |
| 5,927,348 A | * | 7/1999 | Gerresheim et al. .......... 141/65 |
| 6,000,578 A | * | 12/1999 | Boissay ....................... 222/83 |
| 6,053,360 A | * | 4/2000 | Rutter ........................... 222/1 |

FOREIGN PATENT DOCUMENTS

| | | |
|---|---|---|
| GB | 2 102 398 A | 2/1983 |
| GB | 2 206 567 A | 1/1989 |
| GB | 2 342 347 A | 4/2000 |

\* cited by examiner

*Primary Examiner*—Steven O. Douglas
(74) *Attorney, Agent, or Firm*—Birch, Stewart, Kolasch & Birch, LLP

(57) ABSTRACT

A tire puncture sealant set comprises a bottle having a body and a threaded neck portion provided with an outlet, a puncture sealant in the bottle, an inside plug put into the outlet, an outer cap screwed onto the neck portion for covering the inside plug, an injector replaceable with the outer cap, a side wall of the body having a triple layered structure of an inner layer, an outer layer and a middle layer therebetween made of a gas barrier resin so that the body is squeezable by hand, the inside plug provided with a breakable partition wall separating the inside of the bottle from the outside, the injector comprising an adapter cap to be screwed onto the neck portion, a sticking pipe for piercing the breakable partition wall into the inside of the bottle, and a hose for injecting the sealant into a pneumatic tire.

9 Claims, 5 Drawing Sheets

TIRE PUNCTURE SEALANT SET

BACKGROUND OF INVENTION (1) Field of Invention

The present invention relates to a tire puncture sealant set focused on environmental issues.

(2) Description of Related Art

Single use aerosol can type tire sealant is generally well known and is useful for emergency repair of a puncture wound in a pneumatic tire. However, there are problems of disposal. As the sealant has a quality guaranteed term, after the expiration, it is condemned. Further, it is difficult to reuse the aerosol can, therefore the recycling efficiency is low. Furthermore, the propellants such as hydrocarbon propellant. chlorofluorocarbon propellant and hydrochlorofluro-carbon propellant more or less contribute to depletion of the earth's ozone layer.

Therefore, there is a strong demand for a reusable container for a tire puncture sealant, a container capable of extending the a quality guaranteed term, and a system being capable of injecting the sealant into a flat tire without using a propellant.

SUMMARY OF INVENTION

It is therefore, an object of the present invention to provide a tire puncture sealant set or kit which is focused on environmental issues and can meet the above-mentioned demands.

According to one aspect of the present invention, a tire puncture sealant set comprises a bottle having a manually squeezable body and a threaded neck portion provided with an outlet, a puncture sealant in the bottle, an inside plug put into the outlet, an outer cap screwed onto the neck portion for covering the inside plug, an injector replaceable with the outer cap, a side wall of the body having a triple layered structure of an inner layer, an outer layer and a middle layer therebetween made of a gas barrier resin, the inside plug provided with a breakable partition wall separating the inside of the bottle from the outside, the injector comprising an adapter cap to be screwed onto the neck portion, a sticking pipe for piercing the breakable partition wall into the inside of the bottle, and a hose for injecting the sealant into a pneumatic tire.

Therefore, by the triple layered structure including the middle layer made of a gas barrier resin, the deterioration of the puncture sealant in the bottle is prevented because ammonia, water and the like of the sealant is prevented from escaping from the bottle. As a result, it becomes possible to obtain a long quality guaranteed term of for example five years. The expired sealant can be easily removed from the bottle as the bottle can be easily opened by removing the outer cap and inside plug. After use or expiration of the sealant, all the parts may be reused except for broken part such as the inside plug broken in use.

BRIEF DESCRIPTION OF DRAWINGS

Embodiments of the present invention will now be described in detail in conjunction with the accompanying drawings.

DETAILED DESCRIPTION OF THE INVENTION

Figure 1:
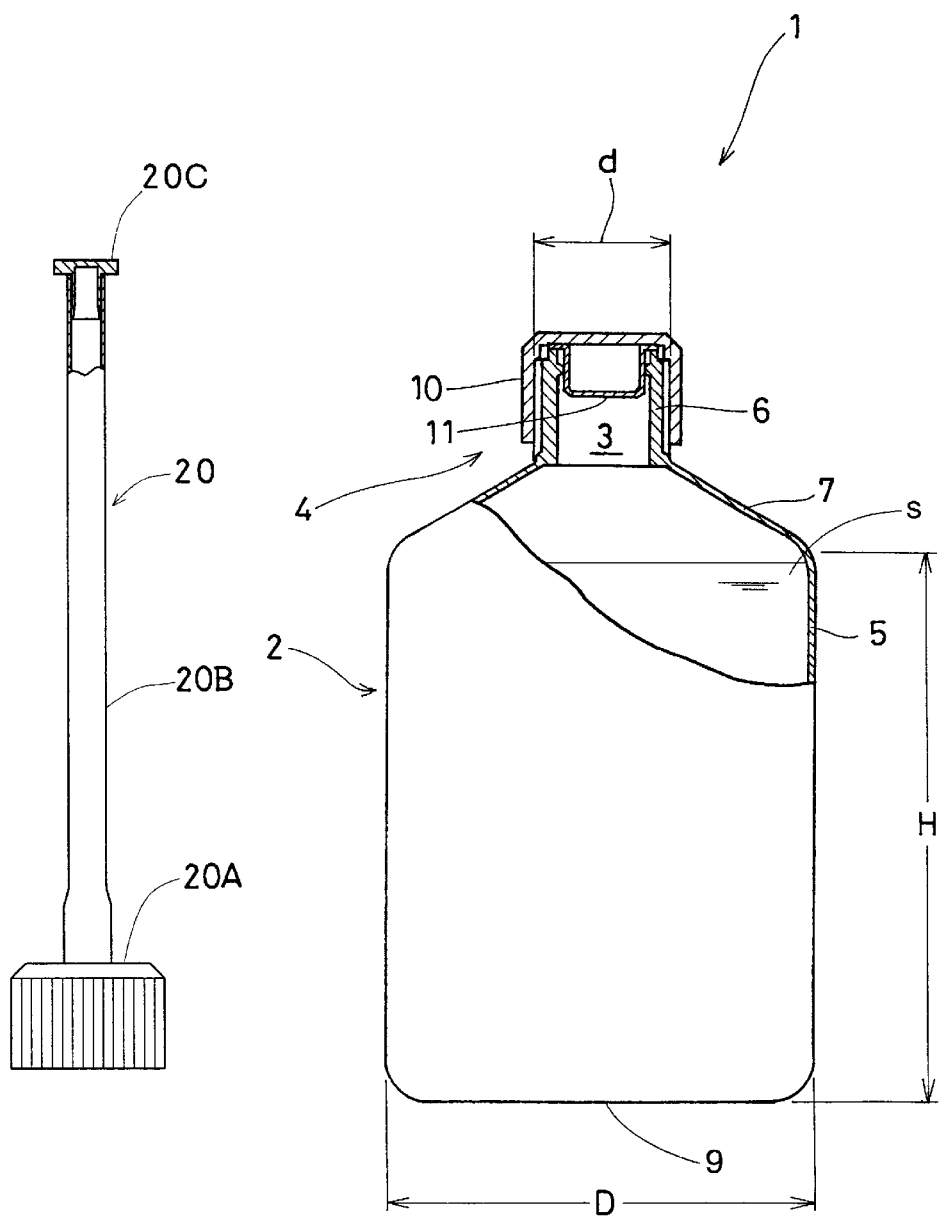
FIG. 1 shows a puncture sealant set according to the present invention.

In the drawings, a puncture sealant set 1 according to the present invention comprises a bottle 2, a puncture sealant s in the bottle 2, an inside plug 11 provided with a breakable partition wall 14, an outer cap 10 covering the inside plug 11, and a replaceable injector 20.

The puncture sealant s is a high-viscosity fluid having a viscosity of about 40 cps (at 20 deg.C) and comprising latex as its main component. Further, as the need arises, tackifier, antifreezing agent and the like may be included.

The bottle 2 comprises a circular cylindrical side wall 5, a threaded neck portion 6 forming an outlet 3, a funnel portion 7 between the neck portion 6 and cylindrical side wall 5, and a bottom 9.

It is important for the bottle 2 (1) to be easily squeezable by hand, (2) to prolong the quality guaranteed term and sell-by date of the puncture sealant s therein by preventing ammonia, water and the like of the puncture sealant s from escaping therefrom by improving the gas impermeability, and (3) to improve the mechanical strength and weathering resistance of the bottle to increase recycling efficiency.

As to the point (1), the side wall 5 has to be squeezable by hand to extract the puncture sealant s from the bottle 2 and inject it into the tire through the outlet 3. Therefore, the side wall 5 is formed into a circular cylindrical shape having a diameter D easy to handle, using a flexible material. Thus, the diameter D is preferably set in a range of from 60 to 90 mm, and the ratio H/D of the height H of the side wall 5 to the diameter D is set in a range of from 1.0 to 1.5.

As to the neck portion 6, on the other hand, the outside diameter (d) is set in a range of from 0.3 to 0.5 times the diameter D. Further, the inside diameter namely the diameter of the outlet 3 is partially decreased by a protrusion 17. The protrusion 17 is formed near the upper end of the outlet 3 and extends continuously along the edge of the opening 6H.

Figure 2:
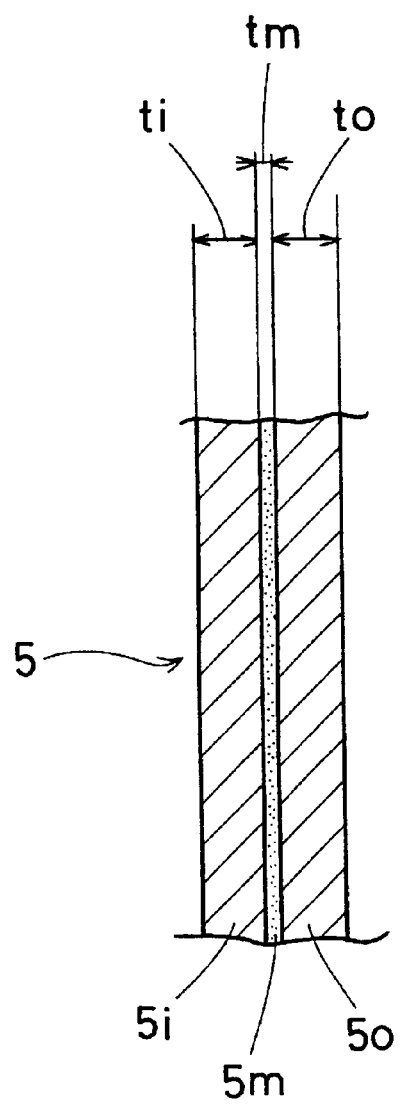
FIG. 2 is an enlarged cross sectional view of the side wall of a bottle showing a triple layered structure therefor.

In order to achieve the points (1), (2) and (3) at the same time, at least the side wall 5 is made of a triple-layered material which is, as shown in FIG. 2, made up of an inner layer 5i, an outer layer 5o and a middle gas-barrier layer 5m sandwiched therebetween. These layers 5i, 5m and 5o are made of at least two kinds of thermoplastic resins and in particular the middle layer 5m is made of a gas barrier resin.

For the gas barrier resin, hydrolysed ethylene vinyl acetate copolymer, polyvinylidene chloride, polyacrylonitrile, polymethxylylene diamine adipate and the like can be suitably used. Especially, hydrolysed ethylene vinyl acetate copolymer (EVOH), specifically, ethylene-vinylalcohol copolymer (EVAL) is preferably used in view of the gas barrier properties, cost and environmental concerns.

In case of the inner layer 5*i* and outer layer 5*o*, plastic materials having weathering resistance and mechanical strength (inclusive of the durability and shock resistance) such as polyethylene, polypropylene, polyester and the like are preferably used. The inner layer 5*i* and outer layer 5*o* can be made of different plastic materials, but it is preferable that they are made of the same plastic material in view of the production efficiency, cost and the like. In this example, both are made of low-density polyethylene in which importance is attached to suppleness than to rigidity because it is also important to prevent the bottle 2 from cracking or breaking during repeating deformation during squeezing.

As to the thickness of the side wall 5, it is preferable that the thickness (tm) of the middle layer 5*m* is set in a range of 0.02 to 0.08 mm, and the thicknesses (ti) and (to) of the inner layer 5*i* and outer layer So, respectively are set in a range of 0.3 to 0.6 mm. This is especially true when the middle layer 5*m* is made of ethylene vinylalcohol copolymer and the inner layer 5*i* and outer layer So are made of low-density polyethylene.

If the thickness (tm) of the middle layer 5*m* is less than 0.02 mm, the quality guaranteed term of the puncture sealant s is liable to shorten. The thickness (tm) more than 0.08 mm increases the cost. If the thickness (ti, to) is less than 0.3 mm, it becomes difficult to obtain the strength. If the thickness (ti, to) is more than 0.6 mm, the side wall becomes so hard to squeeze.

In any case, the bottle 2 has to have a withstanding pressure of from about 200 to 450 kPa at least.

Figure 3:
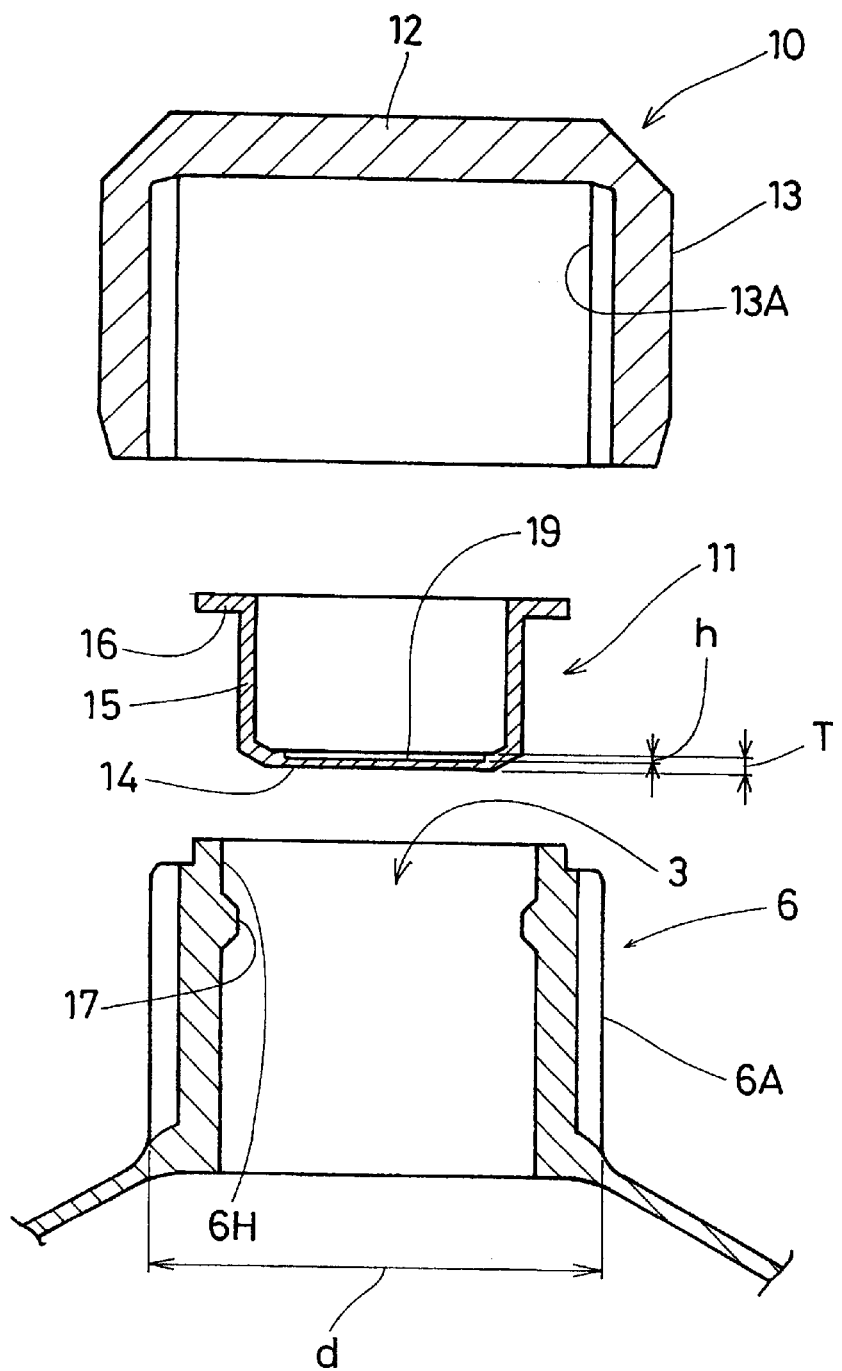
FIG. 3 is an enlarged cross sectional view showing an outer cap, an inside plug and a neck portion of the bottle.

As shown in FIG. 3, the above-mentioned inside plug 11 comprises a cylindrical portion 15, a flange 16 at the upper edge of the cylindrical portion 15, and a circular breakable partition wall 14 at the lower end of the cylindrical portion 15.

The cylindrical portion 15 is pushed in the opening 6H of the outlet 3 in the neck portion 6, and the breakable partition wall 14 goes beyond the protrusion 17 in a state that the flange 16 comes into contact with the upper end of the neck portion 6 as shown in FIG. 1. The outside diameter of the cylindrical portion 15 is slightly larger than the inside diameter of the protrusion 17. Accordingly, the cylindrical portion 15 is forced to slightly decreasing the outside diameter and the outer surface of the cylindrical portion 15 closely contacts with the protrusion 17, and the inside plug 11 does not easily come off due to the presence of the partition wall 14 because the partition wall 14 resists to the deformation during passing through the decreased diameter part at the protrusion 17.

Figure 4:
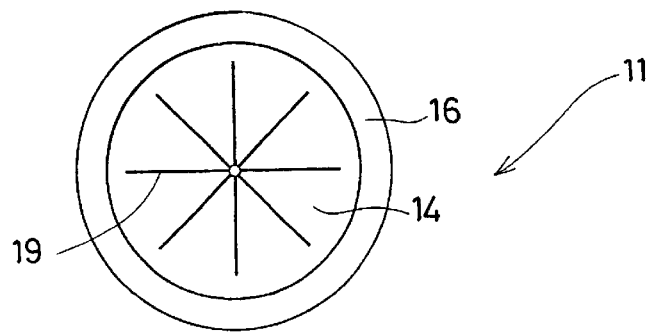
FIG. 4 is a top view of the inside plug showing an arrangement of weakening lines on the breakable partition wall.
Figure 6:
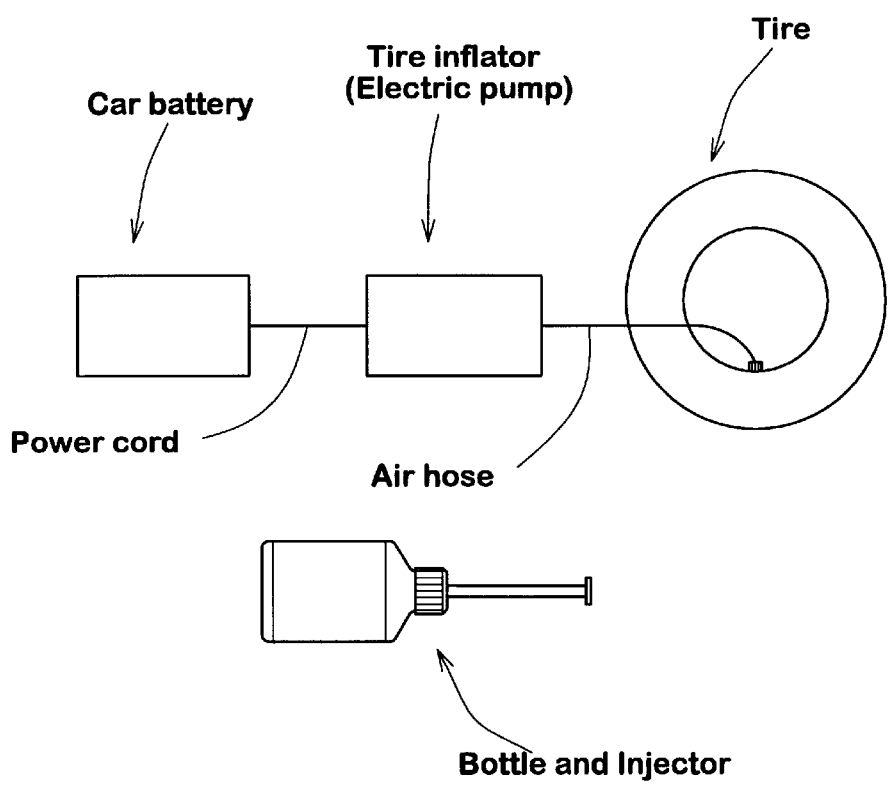
FIG. 6 shows the bottle and injector sealant set along with a tire inflator (electronic pump), tire, air hose, power cord and car battery.

The breakable partition wall 14 is, as shown in FIG. 4, provided with at least three weakening lines 19 arranged in a radial pattern, namely, extending from the center equiangularly around the center. In this example, a small circular dent is formed at the center and eight weakening lines 19 extend from the edge of the dent. The weakening lines 19 and dent have a depth (h) in a range of from 10 to 50% of the thickness T of the breakable partition wall 14 (in this example about 0.3 mm).

The above-mentioned outer cap 10 comprises a circular platy top 12 and a cylindrical skirt 13 of which inside is threaded. The interior screw 13A of the skirt 13 engages the exterior screw 6A of the neck portion 6. The above-mentioned flange 16 of the inside plug 11 is fastened between the inside of the circular platy top 12 and the upper end of the neck portion 6, and functions as a gasket.

The above-mentioned injector 20 comprises a flexible hose 20B and an adapter cap 20A.

Figure 5:
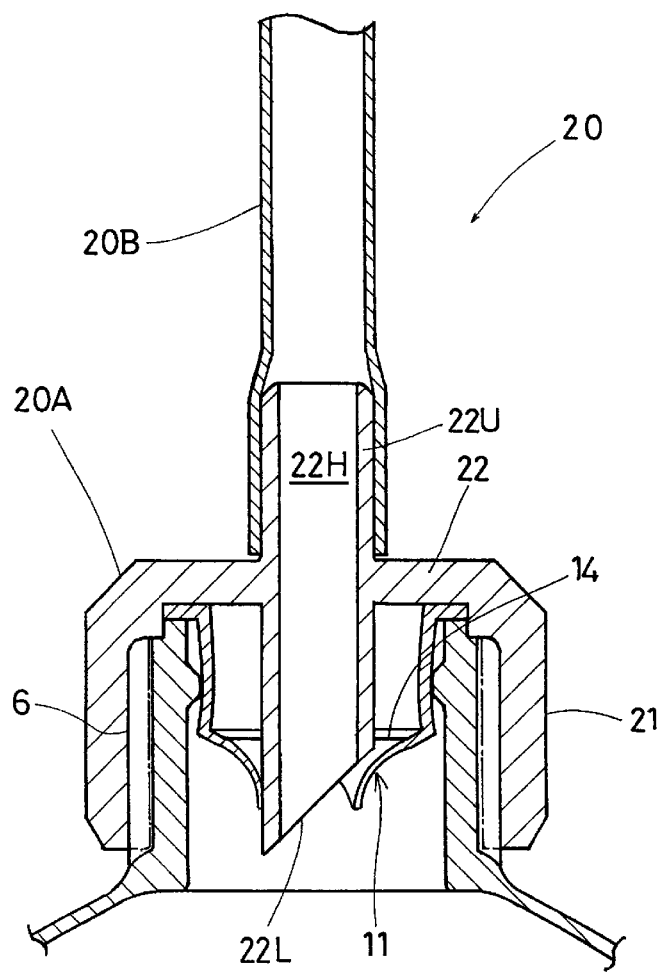
FIG. 5 is an enlarged cross sectional view showing an adapter cap in a state screwed onto the neck portion of the bottle.

FIG. 5 shows a state that the injector 20 is attached to the bottle 3 instead of the outer cap 10.

The adapter cap 20A comprises a cylindrical skirt 21 of which inside is threaded, a circular platy top 22 at the upper edge of the cylindrical skirt 21, a coupling 22U protruding outwards from the top 22 and tightly inserted in one end of the flexible hose 20B, a sticking pipe 22L protruding inwards from the inside of the top 22, and a through hole 22H extending from the inner end of the sticking pipe 22L to the upper end of the coupling 22U.

The interior screw of the skirt 21 engages the exterior screw 6A of the neck portion 6.

The inner end of the sticking pipe 22L is cut obliquely to make a sharp edge so as to be able to break the weakening lines 19 easily and pierces the broken partition wall 14 by the motion accompanying with the screwing the adapter cap 20A.

The hose 20B is constructed of a clear vinyl composition, e.g. polyvinyl chloride, and the size is for example as follows: the inside diameter is 7 mm; the outside diameter is 9 mm; and the length is about 100 to 150 mm. In order to prevent the sealant from spouting out at the time of attaching the injector 20 to the bottle 2, a plug 20C is put into the other end of the flexible hose 20B.

The above-mentioned outer cap 10 and inside plug 11 can be made of thermoplastic resins which is not a gas barrier resin because the area exposed to the sealant s is small and the seal is doubled. Also the adapter cap 20A can be made of the same material as the outer cap 10. Preferably, the inside plug 11 is made of polyethylene having elasticity so as to be able to function as a gasket as explained above.

For example, the bottle 2 in this example can be manufactured by first making a triple layered parison using a multilayer injection molding machine and then blow molding the parison using a biaxial-drawing blow-molding machine. In this case, therefore, the entirety of the bottle 2 is formed in the triple layered structure.

The following Table 1 shows test results. Bottles were made as above according to the specifications shown in Table 1, and their gas barrier property and withstanding pressure were measured as follows.

Gas barrier property: According to ASTM D3985, the oxygen permeability was measured at a temperature of 30 deg.c and relative humidity of 80%. The smaller the value, the better the gas barrier property.

Withstand pressure: Increasing the pressure of the water filling the bottle, the pressure at which the bottle was broken was measured as the withstand pressure of the bottle.

TABLE 1

| Bottle | | Ref. | Ex. 1 | Ex. 2 |
|---|---|---|---|---|
| Diameter D | (mm) | 86 | 86 | 86 |
| Height H | (mm) | 120 | 120 | 120 |
| Diameter d | (mm) | 32 | 32 | 32 |
| Side wall | | | | |
| Total thickness | (mm) | 1.0 | 1.0 | 1.0 |
| Inner layer | | | | |
| Material | | LDPE | LDPE | LDPE |
| Thickness | (mm) | | 0.46 | 0.485 |
| Middle layer | | | | |

TABLE 1-continued

| Bottle | | Ref. | Ex. 1 | Ex. 2 |
|---|---|---|---|---|
| Material | | LDPE | EVAL | EVAL |
| Thickness | (mm) | | 0.08 | 0.030 |
| Outer layer | | | | |
| Material | | LDPE | LDPE | LDPE |
| Thickness | (mm) | | 0.46 | 0.485 |
| Gas barrier property | (cc/day) | 6.1 | 0.05 | 0.23 |
| withstand pressure | (kpa) | 310 | 303 | 305 |

*1) EVAL = Ethylene-vinyl alcohol copolymer
*2) LDPE = Low-density polyethylene

If the diameter D of the bottle in the side wall is less than 60 mm, the amount of extract by one squeeze becomes decreased and the operation time increases. Therefore, it is not preferable. If the diameter D is more than 90 mm, it becomes difficult to handle and obtain suitable resilience. If the ratio H/D of the height D of the side wall to the diameter D is less than 1.0, it becomes difficult to deform the side wall 5 due to the bottom 9 and funnel portion 7. If the ratio H/D is more than 1.5, it becomes difficult to obtain suitable resilience. If the diameter (d) of the neck portion is less than 0.3 times the diameter D, it is difficult to make the bottle by blow molding because the diameter difference is too large. The diameter (d) which is more than 0.5 times the diameter D is not preferable in view of the above-mentioned point (2).

The usage of the puncture sealant set is as follows: remove the outer cap 10 from the bottle 2; attach the adapter cap 20A to the neck portion 6 by screwing—as a result, the inner end of the sticking pipe 22L breaks the partition wall 14 and the sticking pipe 22L pierces the partition wall 14; remove the plug 20C from the flexible hose 20B to open the tip end; connect the open end of the flexible hose 20B to the air valve of a flat tire; squeeze the bottle 2 by hand to inject the sealant into the tire; remove the bottle from the tire after the sealant is completely injected and put the plug 20C into the hose end; and immediately pump up the tire and rotate the tire for a certain time, usually about ten minutes, whereby the puncture wound is sealed with the sealant.

After use, the broken inside plug 11 is replaced with a new one, and the bottle 2 is reused by filling the sealant. Also after expiration of the quality guaranteed term, the sealant is replaced with a new one, and not only the bottle 2 but also the inside plug 11 is if possible reused.

Thus, as being a tire puncture repair kit, the puncture sealant set according to the present invention may include a small-sized air pump for inflating the tire which is operatable with a car battery. Such pump is usually separate from the vehicle, but it may be integrated with the vehicle.

What is claimed is:

1. A tire puncture sealant set comprising
   a bottle having a body and a threaded neck portion provided with an outlet,
   a puncture sealant in the bottle,
   an inside plug put into the outlet,
   an outer cap screwed onto the neck portion for covering the inside plug,
   an injector replaceable with the outer cap,
   a side wall of the body having a triple layered structure of an inner layer, an outer layer and a middle layer therebetween made of a gas barrier resin so that the body is squeezable by hand,
   the inside plug provided with a breakable partition wall separating the inside of the bottle from the outside,
   the injector comprising
      an adapter cap to be screwed onto the neck portion,
      a sticking pipe for piercing the breakable partition wall into the inside of the bottle, and
      a hose for injecting the sealant into a pneumatic tire.

2. A tire puncture sealant set according to claim 1, wherein
   the outside diameter D of the boy of the bottle is in a range of from 60 to 90 mm, and
   the height H of the body is in a range of from 1.0 to 1.5 times the diameter D.

3. A tire puncture sealant set according to claim 1 or 2, wherein
   the inner layer and outer layer are made of polyethylene, and the middle layer is made of a hydrolysed ethylene vinyl acetate copolymer.

4. A tire puncture sealant set according to claim 3, wherein
   the hydrolysed ethylene vinyl acetate copolymer is ethylene-vinyl alcohol copolymer.

5. A tire puncture sealant set according to claim 1, wherein
   the bottle is provided between the body and the neck portion with a funnel portion being tapered from the body to the neck portion.

6. A storage container for tire puncture sealant comprising
   a bottle having a manually squeezable body, a threaded neck portion provided with an outlet, and a funnel portion therebetween,
   an inside plug to be put into the outlet,
   an outer cap to be screwed onto the neck portion for covering the inside plug,
   the inside plug provided with a breakable partition wall separating the inside of the bottle from the outside, the breakable partition wall provided with weakening lines arranged in a radial pattern,
   a side wall of the body having a triple layered structure of an inner layer, an outer layer and a middle layer therebetween made of a gas barrier resin, and
   an injector to be attached to the neck portion instead of the outer cap in a state that the inside plug is put into the outlet, the injector comprising an adapter cap to be screwed onto the neck portion, a sticking pipe for piercing the breakable partition wall into the inside of the bottle, and a hose for injecting the sealant into a pneumatic tire.

7. A storage container and injector set for tire puncture sealant according to claim 6, wherein the inner layer and outer layer are made of polyethylene, and the middle layer is made of a hydrolysed ethylene vinyl acetate copolymer.

8. A tire puncture repair kit comprising a tire puncture sealant set according to claim 1 and a tire inflator.

9. A tire puncture repair kit according to claim 8, wherein the tire inflator is an electric pump operable with a car battery.

* * * * *